United States Patent
Kemoun

(10) Patent No.: US 7,842,262 B2
(45) Date of Patent: Nov. 30, 2010

(54) PROCESS AND APPARATUS FOR SEPARATING GAS FROM A MULTI-PHASE MIXTURE BEING RECYCLED IN A REACTOR

(75) Inventor: Abdenour Kemoun, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 382 days.

(21) Appl. No.: 12/002,772

(22) Filed: Dec. 19, 2007

(65) Prior Publication Data

US 2009/0159499 A1      Jun. 25, 2009

(51) Int. Cl.
*C10G 45/00* (2006.01)

(52) U.S. Cl. .................... 422/234; 422/139; 422/140; 422/145; 208/143

(58) Field of Classification Search .......... 422/139–140, 422/145, 234
See application file for complete search history.

(56) References Cited

U.S. PATENT DOCUMENTS

| | | |
|---|---|---|
| 4,457,834 A | 7/1984 | Caspers et al. |
| 4,539,183 A | 9/1985 | Clark et al. |
| 4,875,995 A | 10/1989 | Van Driesen et al. |
| 4,925,638 A | 5/1990 | Chakravarti et al. |
| 4,960,571 A | 10/1990 | Bhagat et al. |
| 5,021,147 A | 6/1991 | Van Driesen et al. |
| 6,183,702 B1 | 2/2001 | Nguyen et al. |
| 6,278,034 B1 | 8/2001 | Espinoza et al. |
| 6,454,932 B1 | 9/2002 | Baldassari et al. |
| 6,726,832 B1 | 4/2004 | Baldassari et al. |
| 2006/0058474 A1* | 3/2006 | Covezzi et al. ............... 526/65 |
| 2006/0078483 A1 | 4/2006 | Kemoun et al. |
| 2007/0140927 A1 | 6/2007 | Reynolds |

OTHER PUBLICATIONS

U.S. Appl. No. 12/002,769, filed Dec. 19, 2007, inventor Abdenour Kemoun.
U.S. Appl. No. 12/002,771, filed Dec. 19, 2007, inventor Abdenour Kemoun.
U.S. Appl. No. 12/002,770, filed Dec. 19, 2007, inventor Abdenour Kemoun.

* cited by examiner

*Primary Examiner*—Robert J Hill, Jr.
*Assistant Examiner*—Brian McCaig

(57) ABSTRACT

A reactor in which a multi-phase mixture, including gas and a catalyst slurry or liquid, is to be conducted. The reactor includes a reaction chamber having a substantially unencumbered center portion through which the multi-phase mixture is conducted upwardly. A downcomer arrangement is disposed laterally outwardly of the center portion and adjacent to an inner surface of the reaction chamber. An external pump communicates with a lower portion of the reaction chamber for circulating components of the mixture downward from an upper end of the downcomer arrangement to a lower end thereof. A collection chamber is disposed below the reaction chamber into which the components exiting the downcomer arrangement are introduced and where the gas is separated from the remainder of the components. The separated gas can be reintroduced into the reaction chamber.

9 Claims, 2 Drawing Sheets

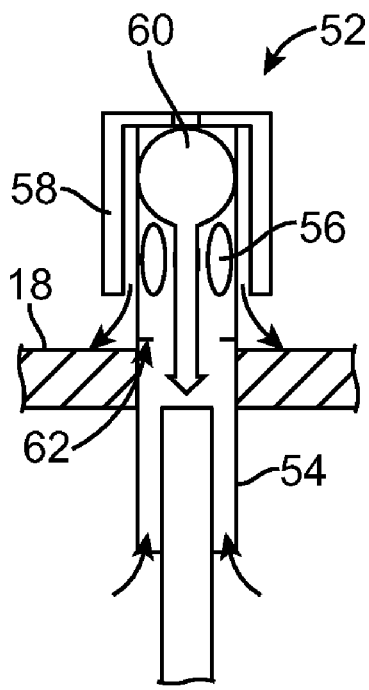
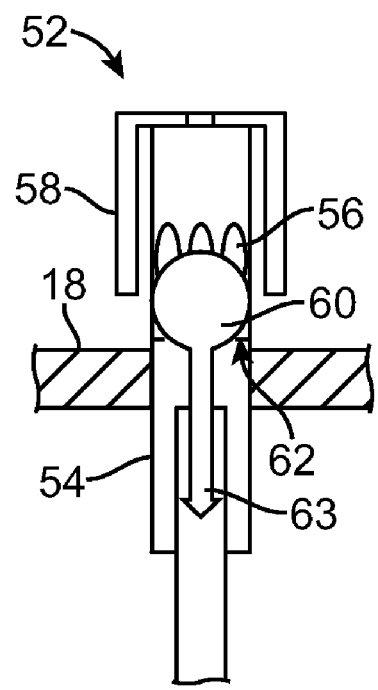
FIG. 2A
FIG. 2B
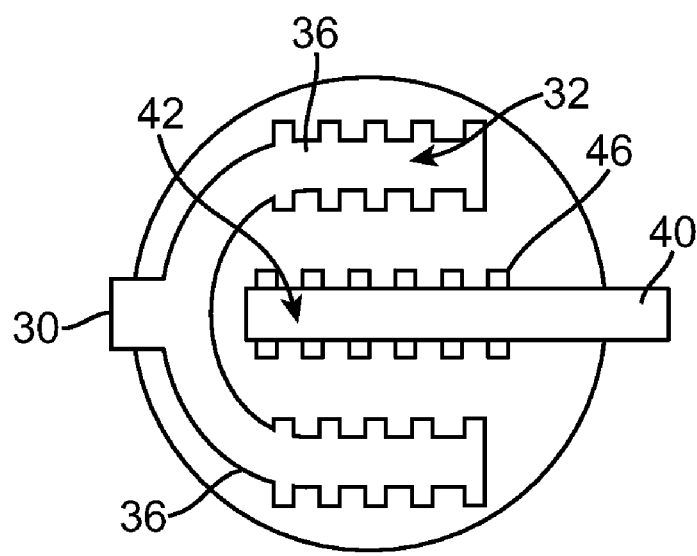
FIG. 3

PROCESS AND APPARATUS FOR SEPARATING GAS FROM A MULTI-PHASE MIXTURE BEING RECYCLED IN A REACTOR

FIELD OF ART

Disclosed is a reactor, for example, for upgrading heavy hydrocarbons.

BACKGROUND

It has been proposed to upgrade heavy hydrocarbons via hydroprocessing in which the hydrocarbons are admixed with an active catalyst composition in liquefied slurry form. As disclosed in U.S. Published Application No. 2007/0140927, the disclosure of which is incorporated herein by reference, a feed of heavy hydrocarbons and catalyst slurry is introduced into the lower portion of a reactor chamber, along with hydrogen in a gas phase. Those components travel upwardly within the chamber, enabling the hydrogen to react with, and hydrogenate, the hydrocarbons. Near an upper portion of the chamber, the hydrogenated hydrocarbons are removed as is excess hydrogen gas.

A flow of liquefied catalyst slurry and residual hydrogen gas is recirculated within the chamber through a vertically oriented downcomer in the chamber under the action of a recirculation pump. The downcomer has traditionally been located coaxially in the center of the reaction chamber. The mixing which occurs in the downcomer tends to keep the catalyst concentration profile and the temperature profile generally uniform along the height of the reactor.

Multi-phase mixture exiting the downcomer is recirculated, e.g., back into the reaction chamber or elsewhere. The recirculation is effected by a pump, the efficiency of which is reduced by the presence of gas bubbles in the mixture. Therefore, at or near its upper end the downcomer is typically provided with a degassing section, e.g., in the form of a generally frusto-conical pan which is upwardly open and leads downwardly to a usually cylindrical transport section of the downcomer. Due to the degassing section being of relatively large diameter, travel of the multi-phase mixture therein is slower than the natural ascension velocity of the hydrogen gas bubbles, thereby facilitating escape of the bubbles from the rest of the multi-phase flow.

Notwithstanding those efforts, gas bubbles will still exit the downcomer and reduce the pump efficiency, or possibly even damage the pump. It would, therefore, be desirable to further separate gas bubbles from the mixture being recirculated.

It would further be desirable to reduce the power requirements of the pump.

SUMMARY

Disclosed herein is a reactor in which a multi-phase mixture, including gas and a catalyst slurry or liquid, is to be conducted, the reactor comprising:
 a reaction chamber having a substantially unencumbered center portion through which the multi-phase mixture is conducted upwardly;
 a downcomer arrangement disposed laterally outwardly of the center portion and adjacent to an inner surface of the reaction chamber; and
 an external pump communicating with a lower portion of the reaction chamber for circulating components of the mixture downward from an upper end of the downcomer arrangement to a lower end thereof.

It is contemplated that a gas-containing pocket of the collection chamber communicates with the reaction chamber independently of the pump, and that the pump is connected to recycle the remaining components from the collection chamber to the reaction chamber.

Also disclosed is a process for the hydro-conversion of heavy hydrocarbons in a reactor, comprising:
 A. providing a mixture of components including heavy hydrocarbons, catalyst, and hydrogen gas in a lower portion of a reaction chamber of the reactor;
 B. conducting the mixture upwardly in a substantially unencumbered center section of the reaction chamber, and then
 C. conducting at least the heavy hydrocarbons and catalyst components of the mixture by pumping those components downwardly through a downcomer arrangement disposed laterally of the center and near an inner surface of the reaction chamber.

A preferred step also comprises separating the hydrogen gas from the heavy hydrocarbons and catalyst after exiting the downcomer, and reintroducing the hydrogen gas into the lower portion of the reaction chamber separately from the heavy hydrocarbons and catalyst.

BRIEF DESCRIPTION OF THE DRAWINGS

FIG. 2A is a schematic fragmentary view of the reactor showing a valve in an open state.

FIG. 2b is a view similar to FIG. 2A showing the valve closed.

FIG. 3 is a schematic cross-sectional view through the reactor showing distributor devices which introduce components into the reaction chamber.

DETAILED DESCRIPTION OF A PREFERRED EMBODIMENT

Figure 1:
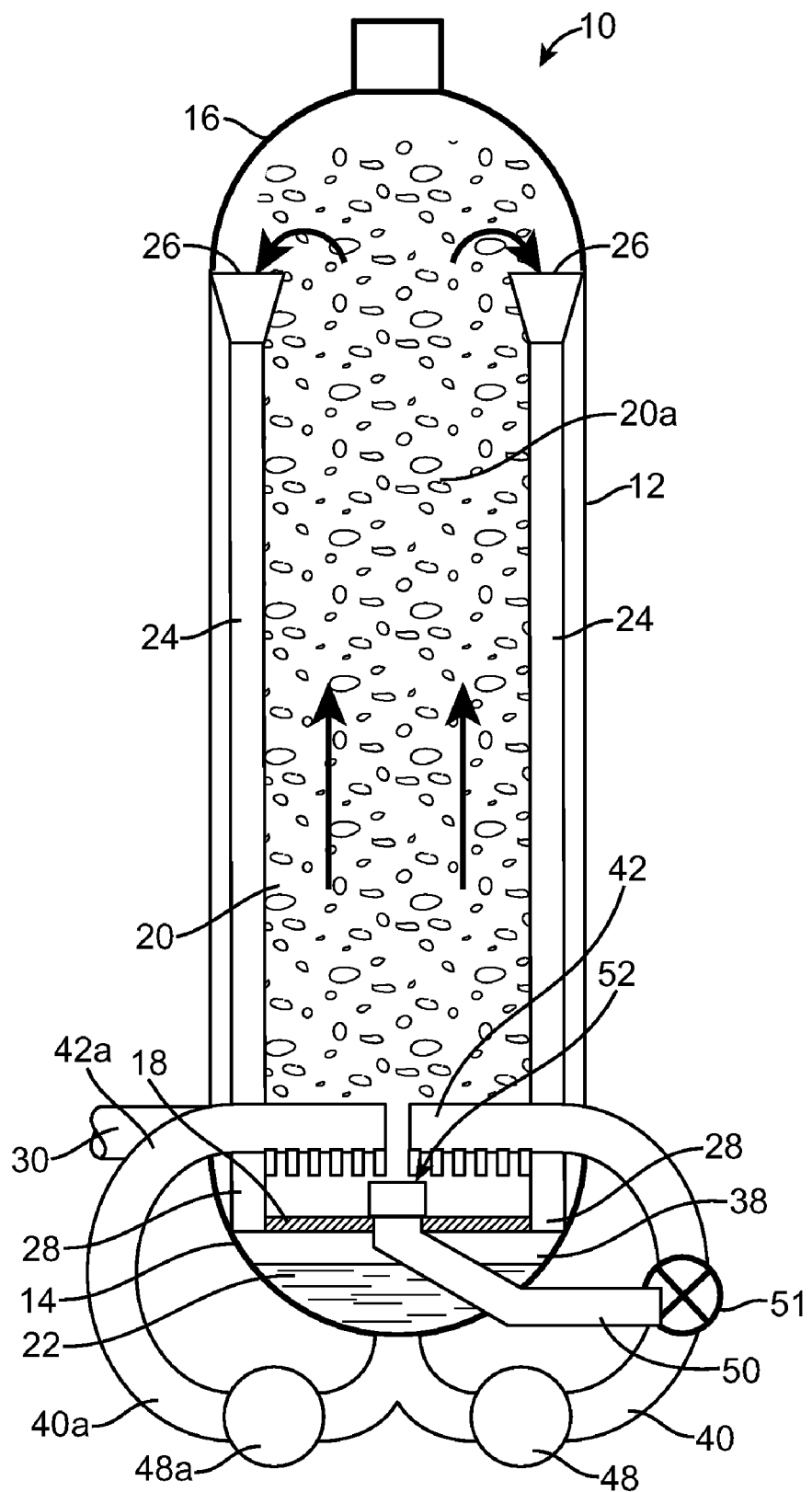
FIG. 1 is a schematic vertical sectional view through a reaction chamber according to the present disclosure.

Depicted in FIG. 1 is a reactor 10, e.g., of the type for hydroprocessing heavy hydrocarbons by a liquefied catalyst slurry and hydrogen gas.

The reactor 10 comprises a cylindrical casing 12 closed off at its ends by a floor 14 and a roof 16. Disposed near the bottom of the reactor's interior is a separation plate 18 which separates a reaction chamber 20 of the interior from a collection chamber 22 disposed therebeneath. Disposed adjacent the inner surface of the reaction chamber 20 is a downcomer arrangement in the form of a plurality of circumferentially spaced cylindrical downcomers 24 having upper inlets 26 disposed near the top of the reaction chamber, and lower outlets 28 arranged to feed directly into the collection chamber 22 through the separation plate 18.

In lieu of a plurality of separate downcomers, the downcomer arrangement could comprise a continuous annular channel arranged around the inner surface of the reaction chamber coaxially with the center vertical axis of the reaction chamber.

A feed pipe 30 is disposed near the bottom of the reaction chamber for feeding in a multi-phase mixture, e.g., heavy hydrocarbons, a catalyst slurry, and hydrogen gas. Alternatively, the gas could be introduced through a separate inlet.

The feed pipe 30 communicates with a distributor 32 disposed at the bottom of the reaction chamber. The distributor can be of any suitable configuration, e.g., comprising a pair of branch lines 36 forming a U-shape and having nozzles directed in any suitable upward, downward or angled directions, through which the multi-phase mixture is discharged into the reaction chamber.

The reactor is configured so that the multi-phase mixture travels upwardly in the reaction chamber in which the heavy hydrocarbons react with the hydrogen. Hydrogenated hydrocarbons are removed from the upper portion of the reaction chamber as is excess hydrogen gas.

By locating the downcomers near the wall of the reaction chamber, the center 20*a* of the reaction chamber, where pressure is typically lowest and gases tend to accumulate, is left unencumbered (open), thus minimizing opposition to the upward travel of mixture. The rising gas tends not to migrate outwardly from the reactor's center to the wall thereof, so less gas becomes entrained in the downward flow through the downcomers. Less entrained gas means less resistance to downward flow.

Furthermore, if the downcomer were instead disposed centrally, the mixture would flow upwardly along the wall of the reaction chamber and would be resisted by friction or surface tension at the wall. Instead, little if any of the mixture will flow upwardly along the wall, depending upon the number and spacing of the downcomers.

By thus decreasing the resistance to the mixture's upward travel, a less powerful, and thus more efficient pump can be used to circulate the mixture.

The pump efficiency is even further increased by the reduction of gas content in the mixture exiting the downcomers, enabling the pump to circulate a low-gas component.

Hydrocarbons, catalyst slurry and residual hydrogen gas are conducted downwardly through the downcomers and into the collection chamber 22. Within the collection chamber the gases migrate upwardly from the liquefied slurry into a gas pocket 38 situated immediately beneath the separation plate 18.

Recirculation of the liquefied slurry mixture from the collection chamber 22 back to the reaction chamber 20 is performed separately of the recirculation of the hydrogen gas as will be explained.

A recirculation conduit 40 extends from a lower end of the collection chamber 22 and runs externally of the reactor before connecting to a distributor 42 located at a lower end of the reaction chamber. The distributor can be of any suitable construction. In an embodiment, the distributor comprises a conduit 44 extending between the branches 36 of the distributor 32 in the same plane therewith. The conduit 44 includes a plurality of downwardly projecting nozzles 46 for discharging the recirculated mixture into the reaction chamber. A pump 48, e.g., of the impeller type, is disposed in the recirculation line 40 for recirculating the mixture.

It will be appreciated that the circulation of the multi-phase mixture through the reactor is achieved by the recirculation pump 48.

If desired, an additional recirculation conduit 40*a*, pump 48*a*, and distributor 42*a* could be provided as shown.

Extending from a valve 51 in the recirculation line 40 is a purge line 50 which periodically functions to remove the gas accumulated in the gas pocket 38 as will be explained. The purge line 50 extends to a gas discharge device 52 which comprises a tube 54 extending through the separation plate 18. The tube defines a passage 55 having a lower inlet end communicating with the gas pocket 38, and an upper outlet end having holes 56 disposed therein. A cap 58 is mounted on the tube to form a channel communicating with the holes 56, the channel discharging above the separation plate, i.e., discharging into the lower portion of the reaction chamber.

Disposed freely movably within the passage 55 is a valve e.g., a ball 60, which has a closed state in which it gravitates onto a seat 62 to block communication between the inlet and outlet of the passage 55.

The purge line 50 extends into the inlet end of the passage 55 while leaving part of the inlet in communication with the gas pocket 38. As the mixture is being recycled through the recirculation line 40, the valve 51 is periodically actuated to cause some of that mixture to be diverted through the purge line, forcing the valve 60 off the seat, and enabling the liquid to flow into the inlet, thereby creating a negative pressure (venturi-action) which draws-in gas from the gas pocket 38. The gas mixes with the by-pass mixture as it is discharged into the reaction chamber.

When the valve 51 is closed to terminate the flow of by-pass fluid, the valve ball 60 gravitates back into the seat 62, and a stem part 63 of the valve enters the purge line to block communication between the purge line and the gas pocket 38.

It will be appreciated that the present disclosure facilitates the upward travel of mixture within the reaction chamber as well as the downward travel of mixture within the downcomer arrangement, thereby reducing the power requirements of the circulation pump 48 (and 48*a* if used). Also, the overall efficiency of the pump is increased by the effective separation of gas from the mixture being recirculated. Moreover, the overall mixing of the components in the reaction chamber is increased across the cross section of the reaction chamber.

Many modifications of the exemplary embodiments disclosed herein will readily occur to those of skill in the art. Accordingly, the present disclosure is to be construed as including all structure and methods that fall within the scope of the appended claims.

What is claimed is:

1. A reactor in which a multi-phase mixture, including gas and a catalyst slurry or liquid, is to be conducted, the reactor comprising:
   a reaction chamber having a substantially unencumbered center portion through which the multi-phase mixture is conducted upwardly;
   a downcomer arrangement disposed laterally outwardly of the center portion and adjacent to an inner surface of the reaction chamber;
   a discharge device having an outlet communicating with the reaction chamber which periodically functions to remove gas accumulating in the reaction chamber;
   an external pump communicating with a lower portion of the reaction chamber for circulating components of the mixture downward from an upper end of the downcomer arrangement to a lower end thereof; and
   a collection chamber disposed below the reaction chamber into which the components exiting the downcomer arrangement are introduced and where the gas is separated from the remainder of the components.

2. The reactor according to claim 1, wherein a gas-containing pocket of the collection chamber communicates with the reaction chamber independently of the pump, and the pump is connected to recycle the remaining components from the collection chamber to the reaction chamber.

3. A reactor in which a multi-phase mixture, including gas, and a slurry or liquid, is to be conducted, the reactor comprising:
   a reaction chamber in which the multi-phase mixture is conducted;
   a collection chamber, separated from the reaction chamber, in which some of the mixture is collected from the reaction chamber, wherein gas from the mixture migrates upwardly to form a gas pocket in the collection chamber; and a recycling mechanism interconnecting the collection chamber and the reaction chamber, and comprising:

a recycling conduit extending from a lower end of the collection chamber and feeding into the reaction chamber, a pump for circulating the mixture through the recycling conduit from the collection chamber to the reaction chamber, a discharge device forming a passage having an inlet communicating with the gas pocket, and an outlet communicating with the reaction chamber, and a purge line for by-passing some of the mixture from the recycling conduit, under pressure from the pump, through the passage in a manner creating a negative pressure for drawing-in gas from the gas pocket, wherein the gas and the by-passing mixture are discharged through the outlet and into the reaction chamber.

4. The reactor according to claim 3 wherein the recycling mechanism further includes a valve movable from a closed state to an open state for opening the passage to couple the inlet with the outlet, wherein the purge line is arranged to direct the by-passing mixture against the valve to move the valve from a closed state to the open state.

5. The reactor according to claim 4 wherein the reaction chamber is separated from the collection chamber by a separation plate extending across an interior of the reaction chamber, the passage of the discharge device extending through the separation plate.

6. The reactor according to claim 5 wherein the reactor is an upflow reactor and includes a downcomer arranged for conducting mixture from an upper end thereof to a lower end thereof which communicates with the collection chamber through the separation plate.

7. The reactor according to claim 3, wherein the recycling conduit feeds into the reaction chamber through a distributor having multiple nozzles.

8. A reactor in which a multi-phase mixture, including gas and a catalyst slurry or liquid, is to be conducted, the reactor comprising:

a reaction chamber having a substantially unencumbered center portion through which the multi-phase mixture is conducted upwardly;

a downcomer arrangement disposed laterally outwardly of the center portion and adjacent to an inner surface of the reaction chamber;

an external pump communicating with a lower portion of the reaction chamber for circulating components of the mixture downward from an upper end of the downcomer arrangement to a lower end thereof;

a collection chamber disposed below the reaction chamber into which the components exiting the downcomer arrangement are introduced and where the gas is separated from the remainder of the components.

9. The reactor according to claim 8, wherein a gas-containing pocket of the collection chamber communicates with the reaction chamber independently of the pump, and the pump is connected to recycle the remaining components from the collection chamber to the reaction chamber.

* * * * *